United States Patent
Yamada et al.

(10) Patent No.: US 10,860,392 B2
(45) Date of Patent: Dec. 8, 2020

(54) ELECTRONIC DEVICE AND IMAGE PROCESSING DEVICE

(71) Applicant: FUJI XEROX CO., LTD., Tokyo (JP)

(72) Inventors: Hideo Yamada, Kanagawa (JP);
Takumi Kawahara, Kanagawa (JP);
Yoshiyuki Kobayashi, Kanagawa (JP);
Shotaro Miyamoto, Kanagawa (JP);
Naoki Sueyoshi, Kanagawa (JP);
Hidenori Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 226 days.

(21) Appl. No.: 15/448,180

(22) Filed: Mar. 2, 2017

(65) Prior Publication Data

US 2018/0089003 A1    Mar. 29, 2018

(30) Foreign Application Priority Data

Sep. 27, 2016    (JP) ................................. 2016-188838

(51) Int. Cl.
*G06F 9/54* (2006.01)
*G06F 9/46* (2006.01)

(52) U.S. Cl.
CPC .............. *G06F 9/542* (2013.01); *G06F 9/547* (2013.01); *G06F 9/466* (2013.01)

(58) Field of Classification Search
CPC ........... G06F 9/542; G06F 9/547; G06F 9/466
See application file for complete search history.

(56) References Cited

U.S. PATENT DOCUMENTS

| 6,202,091 B1* | 3/2001 | Godse | ................... G06F 9/4408 |
| | | | 709/220 |
| 2008/0104305 A1* | 5/2008 | Ichikawa | ............... B41J 3/4071 |
| | | | 711/100 |

(Continued)

FOREIGN PATENT DOCUMENTS

| CN | 101866434 | * 10/2010 | ............... G06K 1/12 |
| EP | 0689139 A2 | 12/1995 | |

(Continued)

OTHER PUBLICATIONS

Sep. 15, 2020 Office Action issued in Japanese Patent Application No. 2016-188838.

*Primary Examiner* — Doon Y Chow
*Assistant Examiner* — Phuong N Hoang
(74) *Attorney, Agent, or Firm* — Oliff PLC

(57) ABSTRACT

An electronic device includes first and second controllers that execute processing based on first and second operating systems (OSes). The first controller includes a command generation unit that generates a command to be executed by the second controller, and a command transmission unit that includes a correspondence relationship associating in advance plural commands to be executed by the second controller with a control code stipulating an execution sequence of the plural commands, and if a control code corresponding to plural commands generated by the command generation unit exists in the correspondence relationship, the command transmission unit assigns the control code to the plural commands and transmits to the second controller. The second-controller receives the plural commands transmitted from the command transmission unit, and executes the plural commands based on the execution sequence stipulated by the assigned control code.

7 Claims, 10 Drawing Sheets

(56) References Cited

U.S. PATENT DOCUMENTS

| | | | |
|---|---|---|---|
| 2009/0185763 A1* | 7/2009 | Park | H04W 4/21 |
| | | | 382/311 |
| 2011/0197203 A1* | 8/2011 | Takeuchi | G06F 9/45512 |
| | | | 719/313 |
| 2012/0167063 A1* | 6/2012 | Detwiler | G06F 8/65 |
| | | | 717/139 |
| 2013/0125126 A1* | 5/2013 | Yokota | G06F 9/48 |
| | | | 718/102 |
| 2013/0167134 A1* | 6/2013 | Shim | G06F 8/654 |
| | | | 717/173 |
| 2013/0227269 A1* | 8/2013 | Ting | H04L 9/12 |
| | | | 713/100 |
| 2014/0043632 A1* | 2/2014 | Uchida | G06F 3/1297 |
| | | | 358/1.13 |
| 2014/0365832 A1* | 12/2014 | Neeb | G06F 11/079 |
| | | | 714/43 |
| 2016/0189332 A1* | 6/2016 | Yoo | G06F 3/04883 |
| | | | 345/156 |
| 2016/0224355 A1* | 8/2016 | Okubo | G06F 9/44505 |
| 2018/0024871 A1* | 1/2018 | Takeuchi | G06F 9/45512 |
| | | | 719/320 |

FOREIGN PATENT DOCUMENTS

| | | | |
|---|---|---|---|
| JP | S60-181959 A | | 9/1985 |
| JP | H08-16411 A | | 1/1996 |
| JP | 3971361 | * | 9/2007 |
| JP | 2012-118949 A | | 6/2012 |
| JP | 2015-005097 A | | 1/2015 |

* cited by examiner

FIG. 7A

| CONTROL CODE | COMMAND | EXECUTION SEQUENCE |
|---|---|---|
| CONTROL CODE 21 | COMMAND 1<br>COMMAND 2<br>COMMAND 3 | · COMMAND EXECUTED FIRST IS COMMAND 1 |
| | | · IF PROCESSING OF COMMAND 1 IS SUCCESSFUL, EXECUTE COMMAND 2 NEXT |
| | | · IF PROCESSING OF COMMAND 2 IS SUCCESSFUL, EXECUTE COMMAND 3 NEXT |
| | | · IF PROCESSING OF COMMAND 3 IS SUCCESSFUL, END ON SUCCESSFUL PROCESSING OF PACKAGED COMMAND |
| | | · IF PROCESSING OF COMMAND 1 FAILS, END ON FAILURE IN PROCESSING OF PACKAGED COMMAND |
| | | · IF PROCESSING OF COMMAND 2 FAILS, END ON FAILURE IN PROCESSING OF PACKAGED COMMAND |
| | | · IF PROCESSING OF COMMAND 3 FAILS, END ON FAILURE IN PROCESSING OF PACKAGED COMMAND |
| CONTROL CODE 22 | COMMAND a<br>COMMAND b<br>COMMAND c | · COMMAND EXECUTED FIRST IS COMMAND a |
| | | · IF PROCESSING OF COMMAND a IS SUCCESSFUL, EXECUTE COMMAND b NEXT |
| | | · IF PROCESSING OF COMMAND b IS SUCCESSFUL, EXECUTE COMMAND c NEXT |
| | | · IF PROCESSING OF COMMAND c IS SUCCESSFUL, END ON SUCCESSFUL PROCESSING OF PACKAGED COMMAND |
| | | · IF PROCESSING OF COMMAND a FAILS, EXECUTE COMMAND c NEXT |
| | | · IF PROCESSING OF COMMAND b FAILS, END ON FAILURE IN PROCESSING OF PACKAGED COMMAND |
| | | · IF PROCESSING OF COMMAND c IS UNSUCCESSFUL, END ON FAILURE IN PROCESSING OF PACKAGED COMMAND |
| ⋮ | ⋮ | ⋮ |

FIG. 7B

| CONTROL CODE | COMMAND | EXECUTION SEQUENCE |
|---|---|---|
| CONTROL CODE 31 | COMMAND 4<br>COMMAND 5<br>COMMAND 6 | • COMMAND EXECUTED FIRST IS COMMAND 4 |
| | | • IF PROCESSING OF COMMAND 4 IS SUCCESSFUL, EXECUTE COMMAND 5 NEXT |
| | | • IF PROCESSING OF COMMAND 5 IS SUCCESSFUL, EXECUTE COMMAND 6 NEXT |
| | | • IF PROCESSING OF COMMAND 6 IS SUCCESSFUL, END ON SUCCESSFUL PROCESSING OF PACKAGED COMMAND |
| | | • IF PROCESSING OF COMMAND 4 FAILS, END ON FAILURE IN PROCESSING OF PACKAGED COMMAND |
| | | • IF PROCESSING OF COMMAND 5 FAILS, END ON FAILURE IN PROCESSING OF PACKAGED COMMAND |
| | | • IF PROCESSING OF COMMAND 6 FAILS, END ON FAILURE IN PROCESSING OF PACKAGED COMMAND |
| CONTROL CODE 32 | COMMAND d<br>COMMAND e<br>COMMAND f | • COMMAND EXECUTED FIRST IS COMMAND d |
| | | • IF PROCESSING OF COMMAND d IS SUCCESSFUL, EXECUTE COMMAND e NEXT |
| | | • IF PROCESSING OF COMMAND e IS SUCCESSFUL, EXECUTE COMMAND f NEXT |
| | | • IF PROCESSING OF COMMAND f IS SUCCESSFUL, END ON SUCCESSFUL PROCESSING OF PACKAGED COMMAND |
| | | • IF PROCESSING OF COMMAND d FAILS, EXECUTE COMMAND f NEXT |
| | | • IF PROCESSING OF COMMAND e FAILS, END ON FAILURE IN PROCESSING OF PACKAGED COMMAND |
| | | • IF PROCESSING OF COMMAND f IS UNSUCCESSFUL, END ON FAILURE IN PROCESSING OF PACKAGED COMMAND |
| ⋮ | ⋮ | ⋮ |

ELECTRONIC DEVICE AND IMAGE PROCESSING DEVICE

CROSS-REFERENCE TO RELATED APPLICATIONS

This application is based on and claims priority under 35 USC 119 from Japanese Patent Application No. 2016-188838 filed Sep. 27, 2016.

BACKGROUND

Technical Field

The present invention relates to an electronic device and an image processing device.

SUMMARY

According to an aspect of the invention, there is provided an electronic device including a first controller that executes processing based on a first operating system (OS), and a second controller that executes processing based on a second OS. The first controller includes a command generation unit that generates a command to be executed by the second controller, and a command transmission unit that includes a correspondence relationship associating in advance plural commands to be executed by the second controller with a control code stipulating an execution sequence of the plural commands, and if a control code corresponding to plural commands generated by the command generation unit exists in the correspondence relationship, the command transmission unit assigns the control code to the plural commands and transmits to the second controller.

The second controller receives the plural commands transmitted from the command transmission unit, and executes the plural commands based on the execution sequence stipulated by the assigned control code.

BRIEF DESCRIPTION OF THE DRAWINGS

An exemplary embodiment of the present invention will be described in detail based on the following figures, wherein:

FIG. 7A is a diagram illustrating an example of a control code table according to an exemplary embodiment;

FIG. 7B is a diagram illustrating an example of a control code table according to an exemplary embodiment;

DETAILED DESCRIPTION

Hereinafter, an exemplary embodiment of the invention will be described in detail and with reference to the attached drawings.

<Description of OS-to-OS Communication>

In an electronic device with a multi-processor configuration including multiple CPUs, communication may be conducted between the OSes executed by each of the CPUs in some cases. Herein, an image processing device that conducts image processing will be taken as an example of an electronic device with a multi-processor configuration, and OS-to-OS communication inside the image processing device will be described.

Figure 1:
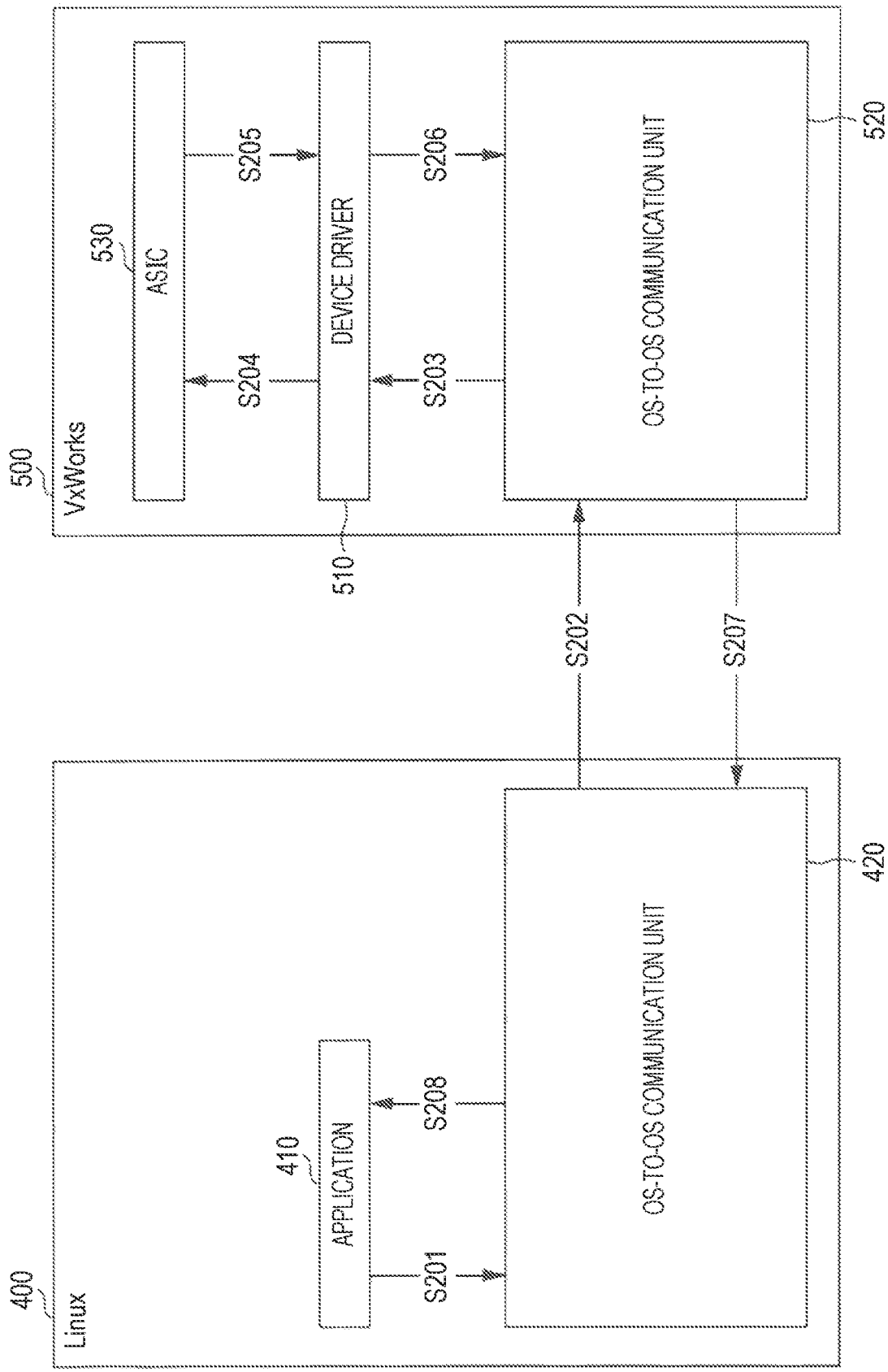
FIG. 1 is a diagram illustrating an example of a flow of communication according to the related art in a case of conducting processing using an ASIC in an image processing device with a multi-processor configuration.

FIG. 1 is a diagram illustrating an example of a flow of communication according to the related art in a case of conducting processing using an application-specific integrated circuit (ASIC) in an image processing device with a multi-processor configuration. An ASIC is an integrated circuit that has been fabricated in a specialized manner for a certain specific application. Herein, in the example illustrated in FIG. 1, Linux (registered trademark), which is open-source software whose source code has been made public, and VxWorks (registered trademark), which is a real-time OS equipped with functions and features for executing processes with time-based constraints, are used as an example of the OSes.

Herein, Linux 400, which denotes the functional unit of Linux, includes an application 410 that conducts processing based on user operations, and an OS-to-OS communication unit 420 that controls OS-to-OS communication. Also, VxWorks 500, which denotes the functional unit of VxWorks, includes an ASIC 530 on which image processing is conducted, a device driver 510 that controls image processing in the ASIC 530, and an OS-to-OS communication unit 520 that controls OS-to-OS communication. Next, a flow of communication will be described in which a command causing processing to be executed in VxWorks 500 is transmitted from the application 410 of Linux 400, and a reply is returned from VxWorks 500.

For example, when the user issues an image processing instruction through the application 410, the application 410 transmits a command for VxWorks 500 to the OS-to-OS communication unit 420 (step 201). Next, the OS-to-OS communication unit 420 transmits the command to the OS-to-OS communication unit 520 of VxWorks 500 (step 202). Next, the OS-to-OS communication unit 520 transmits the command to the device driver 510 (step 203). Next, the device driver 510 analyzes the command, and operates the register values of the ASIC 530 (for example, writes register values and reads out register values) to execute image processing (step 204).

Next, the device driver 510 checks the process result of the image processing (step 205). Next, based on the process result, the device driver 510 transmits a reply to the application 410 of Linux 400 (reply command) to the OS-to-OS communication unit 520 (step 206). This reply command includes information indicating whether or not the image processing in the ASIC 530 is successful. Next, the OS-to-OS communication unit 520 transmits the reply command to the OS-to-OS communication unit 420 of Linux 400 (step 207). Finally, the OS-to-OS communication unit 420 transmits the reply command to the application 410 (step 208), and the processing sequence ends.

At this point, in an electronic device such as an image processing device, by using a high-performance CPU, it is also conceivable to use software intellectual property (IP) (hereinafter designated SWIP) made up of software instead of an ASIC. In this case, the image processing conducted by the ASIC becomes realized by the software IP. Additionally, in the configuration illustrated in FIG. 1, for example, it becomes possible to conduct image processing not by conducting processing with the ASIC 530 on VxWorks 500, but by causing SWIP to run on Linux 400.

Figure 2:
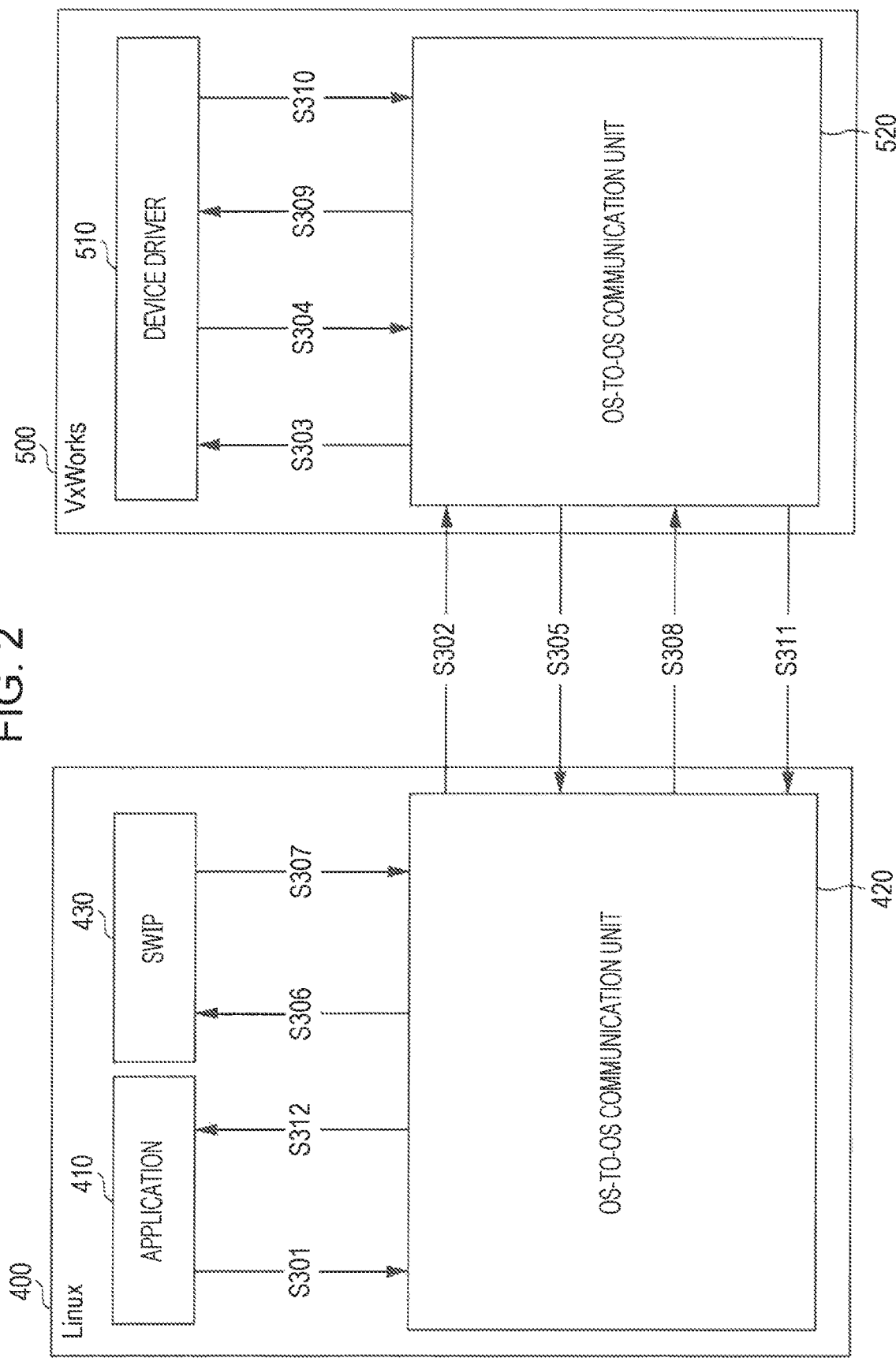
FIG. 2 is a diagram illustrating an example of a flow of communication according to the related art in a case of conducting processing using SWIP in an image processing device with a multi-processor configuration.

FIG. 2 is a diagram illustrating an example of a flow of communication according to the related art in a case of conducting processing using SWIP in an image processing device with a multi-processor configuration. Herein, since Linux 400 is open source, in the case in which the processing details of the device driver 510 are not to be disclosed to external parties, for example, the device driver 510 is made to run on VxWorks 500 rather than on Linux 400. Accordingly, in the configuration illustrated in FIG. 2, while SWIP 430 is made to run on Linux 400, the device driver 510 is made to run on VxWorks 500.

Linux 400, in addition to including the application 410 and the OS-to-OS communication unit 420 similarly to the example of FIG. 1, newly includes the SWIP 430. Also, VxWorks 500 includes the device driver 510 and the OS-to-OS communication unit 520 similarly to the example of FIG. 1, but does not include the ASIC 530. Next, a flow of communication will be described in which a command causing processing to be executed in VxWorks 500 is transmitted from the application 410 of Linux 400, and a reply is returned from VxWorks 500.

First, the application 410 transmits a command for VxWorks 500 to the OS-to-OS communication unit 420 (step 301). Next, the OS-to-OS communication unit 420 transmits the command to the OS-to-OS communication unit 520 of VxWorks 500 (step 302). Next, the OS-to-OS communication unit 520 transmits the command to the device driver 510 (step 303). Next, the device driver 510 analyzes the command, and generates a command to be executed by the SWIP 430 of Linux 400. Subsequently, the generated command is transmitted to the OS-to-OS communication unit 520 (step 304).

Next, the OS-to-OS communication unit 520 transmits the command for the SWIP 430 to the OS-to-OS communication unit 420 of Linux 400 (step 305). Next, the OS-to-OS communication unit 420 analyzes the command, and transmits a function for operating register values to the SWIP 430 (step 306). Next, the SWIP 430 executes image processing by operating register values in accordance with the function, and transmits the process result to the OS-to-OS communication unit 420 (step 307). This process result includes information indicating whether or not the image processing in the SWIP 430 is successful. Next, the OS-to-OS communication unit 420 transmits the process result from the SWIP 430 to the OS-to-OS communication unit 520 (step 308).

Next, the OS-to-OS communication unit 520 transmits the process result from the SWIP 430 to the device driver 510 (step 309). Next, based on the process result from the SWIP 430, the device driver 510 transmits a reply to the application 410 of Linux 400 (reply command) to the OS-to-OS communication unit 520 (step 310). Next, the OS-to-OS communication unit 520 transmits the reply command to the OS-to-OS communication unit 420 of Linux 400 (step 311). Finally, the OS-to-OS communication unit 420 transmits the reply command to the application 410 (step 312), and the processing sequence ends.

Herein, when the ASIC method illustrated in FIG. 1 and the SWIP method illustrated in FIG. 2 are compared, whereas OS-to-OS communication (communication between the OS-to-OS communication unit 420 and the OS-to-OS communication unit 520) occurs two times with the ASIC method, OS-to-OS communication occurs four times with the SWIP method. In other words, with the SWIP method, OS-to-OS communication occurs twice as many times compared to the ASIC method, and the OS-to-OS communication may be said to increase by one round trip.

Figure 3:
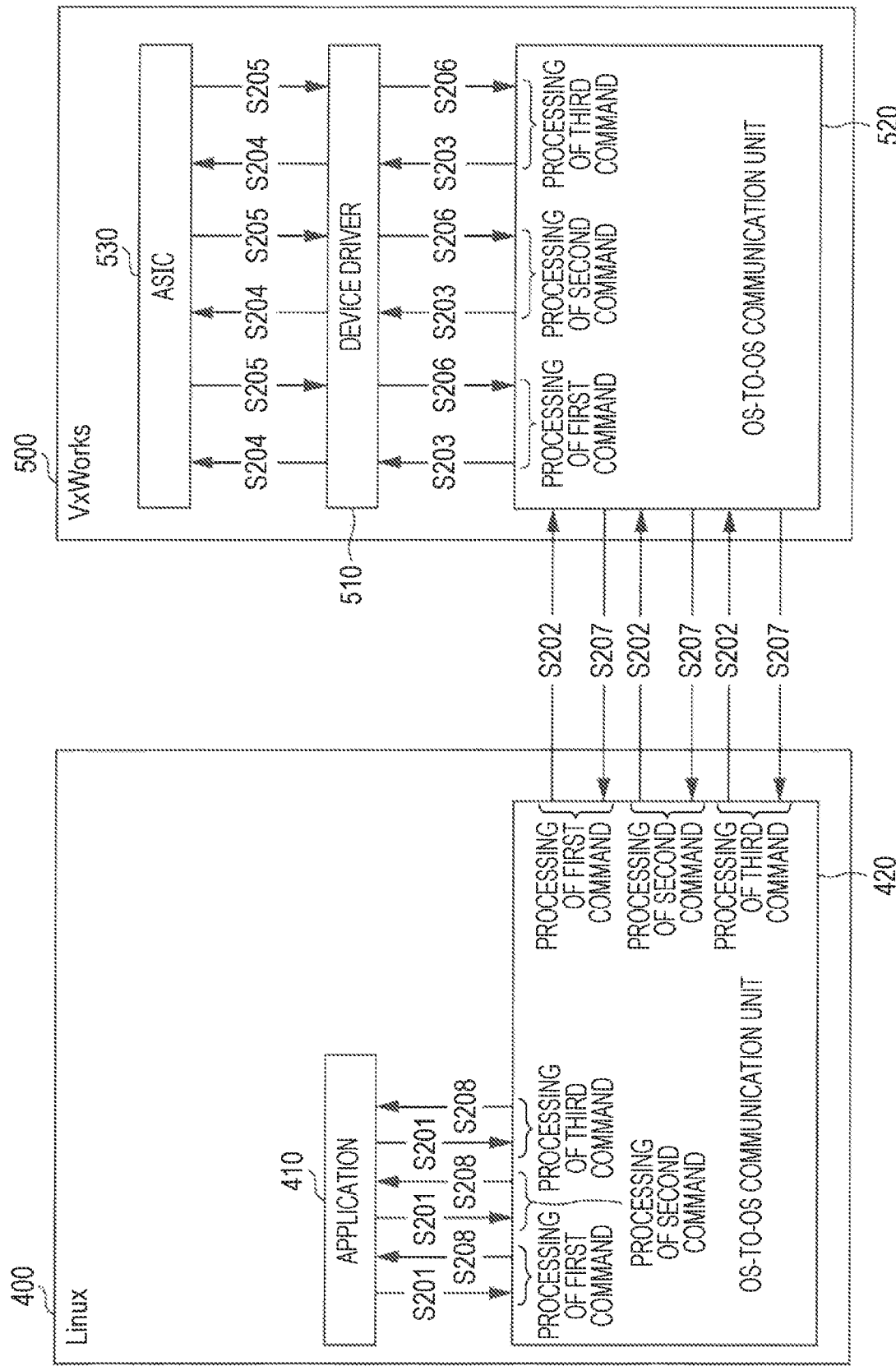
FIG. 3 is a diagram illustrating an example of a flow of communication according to the related art in a case of processing three commands using an ASIC in an image processing device with a multi-processor configuration.
Figure 4:
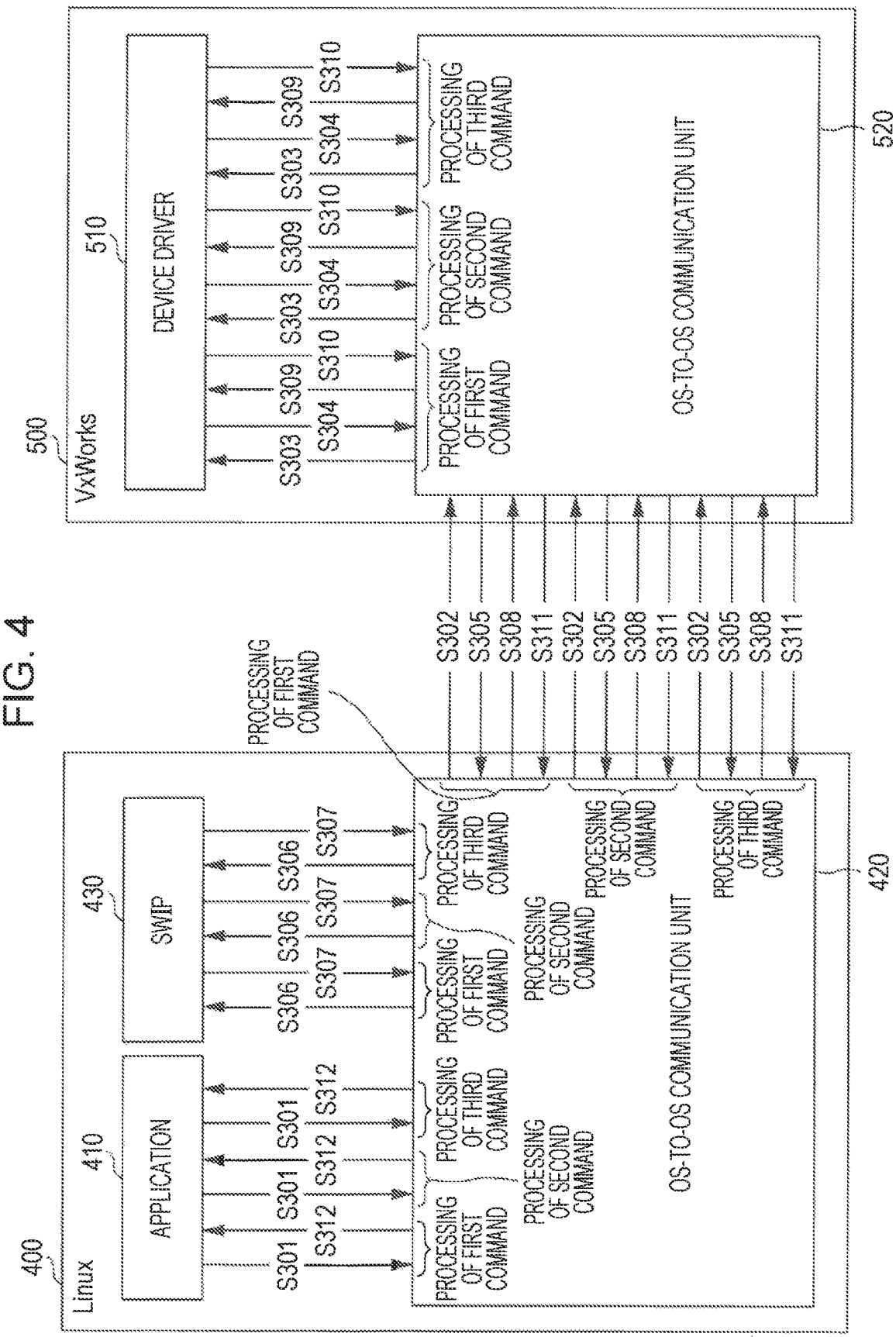
FIG. 4 is a diagram illustrating an example of a flow of communication according to the related art in a case of processing three commands using SWIP in an image processing device with a multi-processor configuration.

Furthermore, the example illustrated in FIG. 1 and the example illustrated in FIG. 2 describe a case in which the application 410 sends one command, but a case in which the application 410 sends three commands in each configuration will now be described. FIG. 3 is a diagram illustrating an example of a flow of communication according to the related art in a case of processing three commands using an ASIC in an image processing device with a multi-processor configuration. Also, FIG. 4 is a diagram illustrating an example of a flow of communication according to the related art in a case of processing three commands using SWIP in an image processing device with a multi-processor configuration.

First, the case of processing three commands with the ASIC method will be described with reference to FIG. 3. In the ASIC method, the processing from step 201 to step 208 illustrated in FIG. 1 is conducted for each of the three commands. In other words, first, the processing from step 201 to step 208 is conducted as the processing of the first command. Next, the processing from step 201 to step 208 is conducted as the processing of the second command. Additionally, the processing from step 201 to step 208 is conducted as the processing of the third command. Also, OS-to-OS communication is conducted a total of six times in order to process the three commands.

Next, the case of processing three commands with the SWIP method will be described with reference to FIG. 4. In the SWIP method, the processing from step 301 to step 312 illustrated in FIG. 2 is conducted for each of the three commands. In other words, first, the processing from step 301 to step 312 is conducted as the processing of the first command. Next, the processing from step 301 to step 312 is conducted as the processing of the second command. Additionally, the processing from step 301 to step 312 is conducted as the processing of the third command. Also, OS-to-OS communication is conducted a total of 12 times in order to process the three commands.

Furthermore, in the case of processing three commands, OS-to-OS communication occurs six times with the ASIC method, whereas OS-to-OS communication occurs 12 times with the SWIP method. In other words, with the SWIP method, OS-to-OS communication occurs twice as many times as with the ASIC method.

Ordinarily, the time of processing conducted inside an OS such as Linux or VxWorks for example is extremely short compared to the time of OS-to-OS communication conducted between OSes, and as OS-to-OS communication occurs a greater number of times, the overall processing time becomes longer. For this reason, according to the methods of the related art, when using the SWIP method illustrated in FIG. 2 to realize the processing conducted by the ASIC method illustrated in FIG. 1, the number of times that OS-to-OS communication occurs becomes doubled. In other words, even though the process result of the image processing is the same, the overall processing time becomes longer. In other words, with the SWIP method illustrated in FIG. 2, productivity is lowered compared to the ASIC method illustrated in FIG. 1.

Accordingly, in the exemplary embodiment, the number of times that OS-to-OS communication occurs is restrained to shorten the overall processing time. Hereinafter, a configuration of an image processing device for realizing the above will be described.

<Hardware Configuration of Image Processing Device>

Figure 5:
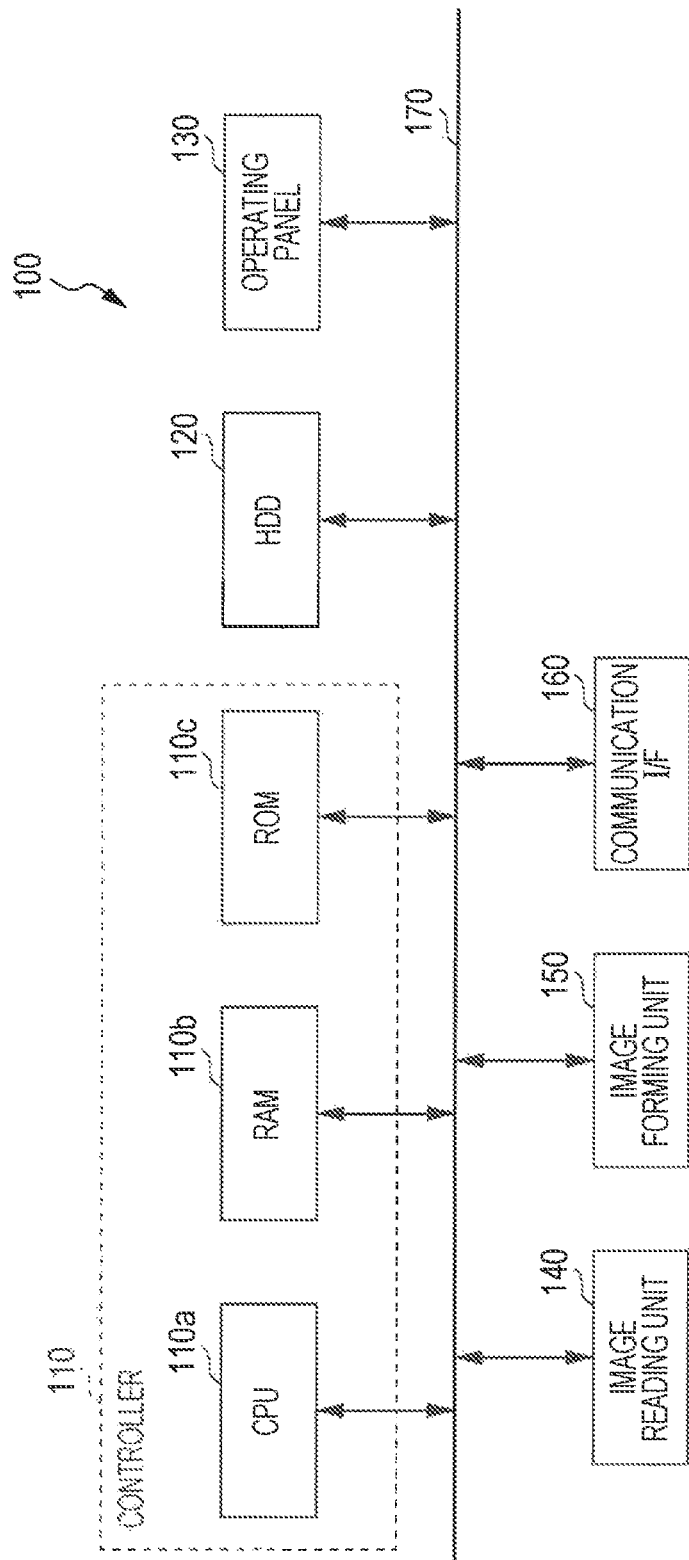
FIG. 5 is a diagram illustrating an exemplary hardware configuration of an image processing device according to an exemplary embodiment.

A hardware configuration of an image processing device 100 according to the exemplary embodiment will be described. FIG. 5 is a diagram illustrating an exemplary hardware configuration of an image processing device 100 according to an exemplary embodiment. The image processing device 100 according to the exemplary embodiment is what is called a multi-function device equipped with various image processing functions, such as an image reading (scan) function, a print function, a copy function, and a facsimile (fax) function, for example.

As illustrated, the image processing device 100 according to the exemplary embodiment is equipped with a controller 110, a hard disk drive (HDD) 120, an operating panel 130, an image reading unit 140, an image forming unit 150, and a communication interface (hereinafter denoted the "communication I/F") 160. Note that these functional units are connected to a bus 170, and exchange data with each other via the bus 170.

The controller 110 controls the operation of each component of the image processing device 100. The controller 110 is made up of a central processing unit (CPU) 110a, random access memory (RAM) 110b, and read-only memory (ROM) 110c.

The CPU 110a realizes the respective functions in the image processing device 100 by loading various programs stored in the ROM 110c or the like into the RAM 110b and executing the programs. The RAM 110b is memory (a storage unit) used as work memory for the CPU 110a, for example. The ROM 110c is memory (a storage unit) that stores information such as various programs executed by the CPU 110a.

In addition, in the exemplary embodiment, the CPU 110a is provided plurally, and communication is conducted between the OSes respectively executed by each CPU 110a. An OS executed by the CPU 110a may be Linux, VxWorks, or the like, for example. In the following, a case in which Linux and VxWorks are used as an example of the OSes will be described.

The HDD 120 is a storage unit that stores various data. The HDD 120 may store data such as image data generated by image reading of the image reading unit 140, and image data received externally via the communication I/F 160.

The operating panel 130 displays various information, and also accepts user operations for performing actions using various functions. The operating panel 130 may be a device such as a touch panel display, for example.

The image reading unit 140 reads an image recorded onto a recording medium such as a sheet of paper, and generates data of the read image (image data). Herein, the image reading unit 140 is a scanner, for example, and may be a charge-coupled device (CCD) scanner in which light from a light source is radiated onto a document and the reflected light therefrom is focused by a lens and sensed by a CCD, or a contact image sensor (CIS) scanner in which light from LED light sources is successively radiated onto a document and the reflected light therefrom is sensed by a CIS.

The image forming unit 150 is a printing mechanism that forms an image onto a recording medium such as a sheet of paper. Herein, the image forming unit 150 is a printer, for example, and may be an electrophotographic system in which an image is formed by causing toner adhering to a photoconductor to be transferred to a recording medium such as a sheet of paper, or an inkjet printer in which an image is formed by ejecting ink onto a recording medium.

The communication I/F 160 is a communication interface that transmits and receives various data to and from other devices via a network (not illustrated).

Additionally, in the image processing device 100, under control by the controller 110, a scanner function is realized by the image reading unit 140, a printer function is realized by the image forming unit 150, a copy function is realized by the image reading unit 140 and the image forming unit 150, and a facsimile function is realized by the image reading unit 140, the image forming unit 150, and the communication I/F 160.

<Configuration of Controller>

Figure 6:
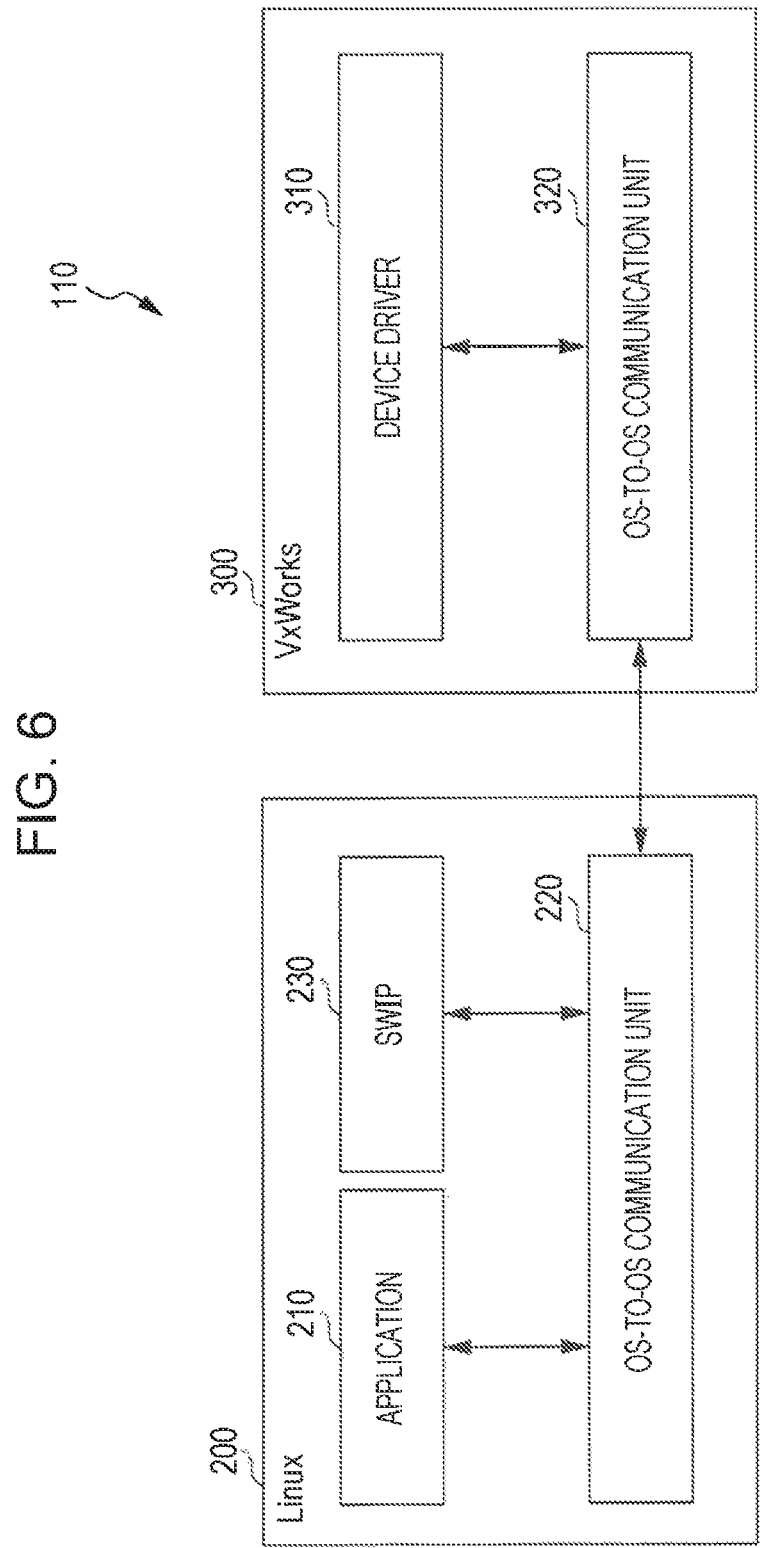
FIG. 6 is a diagram schematically illustrating an exemplary configuration of a controller of an image processing device according to an exemplary embodiment.

FIG. 6 is a diagram schematically illustrating an exemplary configuration of the controller 110 of the image processing device 100 according to the exemplary embodiment. In the controller 110 according to the exemplary embodiment, among multiple CPUs 110a, a Linux OS is realized by one CPU 110a, while a VxWorks OS is realized by another CPU 110a. Accordingly, the function unit in which Linux is executed will be denoted Linux 200, while the function unit in which VxWorks is executed will be denoted VxWorks 300.

Note that in the exemplary embodiment, Linux is used as an example of a first OS, and VxWorks is used as an example of a second OS. Also, Linux 200 is used as an example of a first control unit. In other words, Linux 200 may also be taken to be a control unit that executes processing based on a Linux OS. Furthermore, VxWorks 300 is used as an example of a second control unit. In other words, VxWorks 300 may also be taken to be a control unit that executes processing based on a VxWorks OS.

First, the configuration of Linux 200 will be described.

Linux 200 includes an application 210, an OS-to-OS communication unit 220, and SWIP 230. In the exemplary embodiment, the application 210 is used as an example of a command generation unit. Also, the OS-to-OS communication unit 220 is used as an example of a command transmission unit.

The application 210 is application software that executes various types of information processing. For example, the application 210 accepts a user operation, generates a command for executing image processing, or in other words, a command to be executed by VxWorks 300, and transmits the generated command to the OS-to-OS communication unit 220.

The OS-to-OS communication unit 220 transmits a command received from the application 210 to an OS-to-OS communication unit 320 of VxWorks 300. Herein, when a command is received from the application 210, the OS-to-OS communication unit 220 temporarily stores the received command in a storage unit, and replies to the application 210. Additionally, the OS-to-OS communication unit 220 assigns a control code to multiple received commands, and packages together the multiple commands and the control code. Subsequently, the OS-to-OS communication unit 220 transmits the package of the multiple commands and the control code (hereinafter designated the packaged command) to the OS-to-OS communication unit 320.

More specifically, the OS-to-OS communication unit 220 includes a table (hereinafter designated the control code table) in which multiple commands to be executed by VxWorks 300 are associated with a control code in advance. In other words, the control code table may also be taken to be a table in which multiple commands for executing image processing indicated by user instructions are associated with a control code in advance. In the exemplary embodiment, the control code table is used as an example of a correspondence relationship.

Additionally, the OS-to-OS communication unit 220 references the control code table, and determines whether or not there exists a control code corresponding to multiple commands temporarily stored in the storage unit. In the case of determining that there exists a control code corresponding to multiple commands temporarily stored in the storage unit, the OS-to-OS communication unit 220 assigns the specified control code to the multiple commands temporarily stored in the storage unit (that is, the multiple commands received from the application 210), and generates a packaged command.

Note that for a control code, an execution sequence of the multiple commands included in the packaged command is stipulated. The execution sequence may be the order in which to execute the respective commands included in the packaged command, or a condition on which to end the execution of the respective commands included in the packaged command, for example. Additionally, the execution sequence may also stipulate a command to be executed next if the execution of a command included in the packaged command is successful, or a command to be executed next if the execution of a command included in the packaged command fails. The control code will be discussed later in detail.

Also, as discussed later, the OS-to-OS communication unit 320 of VxWorks 300, similarly to the OS-to-OS communication unit 220, generates a packaged command that packages together commands generated by a device driver 310 with a control code. Accordingly, the OS-to-OS communication unit 220 receives such a packaged command from the OS-to-OS communication unit 320 of VxWorks 300. When the OS-to-OS communication unit 220 receives a packaged command from the OS-to-OS communication unit 320, the OS-to-OS communication unit 220 ascertains the order in which to execute the respective commands included in the packaged command, based on the control code included in the received packaged command. Subsequently, the OS-to-OS communication unit 220 extracts one command at a time out of the packaged command according to the ascertained order, analyzes the extracted command, and transmits a function for operating register values to the SWIP 230.

At this point, every time the OS-to-OS communication unit 220 sends a function to the SWIP 230, the OS-to-OS communication unit 220 receives a process result of the function from the SWIP 230. Subsequently, the OS-to-OS communication unit 220 cross-references the received process result with the control code to conduct subsequent processing. More specifically, based on the received process result and the control code, the OS-to-OS communication unit 220 may continue executing commands included in the packaged command, or end the processing of the packaged command, for example.

The SWIP 230 receives a function for operating register values from the OS-to-OS communication unit 220, and conducts image processing by operating register values according to the received function. Subsequently, the SWIP 230 transmits the process result of the image processing to the OS-to-OS communication unit 220. This process result includes information indicating whether or not the image processing in the SWIP 230 is successful.

Next, a configuration of VxWorks 300 will be described. VxWorks 300 includes a device driver 310 and an OS-to-OS communication unit 320.

The OS-to-OS communication unit 320 receives a packaged command generated by the OS-to-OS communication unit 220 from the OS-to-OS communication unit 220 of Linux 200. After receiving the packaged command, the OS-to-OS communication unit 320 ascertains the order in which to execute the respective commands included in the packaged command, based on the control code included in the received packaged command. Subsequently, the OS-to-OS communication unit 320 extracts one command at a time out of the packaged command according to the ascertained order, and transmits the extracted command to the device driver 310.

At this point, every time the OS-to-OS communication unit 320 sends a command to the device driver 310, the OS-to-OS communication unit 320 receives a result of processing the command from the device driver 310. Subsequently, the OS-to-OS communication unit 320 cross-references the received process result with the control code to conduct subsequent processing. More specifically, based on the received process result and the control code, the OS-to-OS communication unit 320 may continue transmitting commands included in the packaged command to the device driver 310, or end the processing of the packaged command, for example.

Also, as discussed later, by processing a command received from the OS-to-OS communication unit 320, the device driver 310 generates a command to be executed by the SWIP 230. In other words, the OS-to-OS communication unit 320 receives a command to be executed by the SWIP 230 as a process result from the processing of a command by the device driver 310. Accordingly, when the OS-to-OS communication unit 320 receives a command to be executed by the SWIP 230 from the device driver 310, the OS-to-OS communication unit 320 temporarily stores the received command in a storage unit. Subsequently, the OS-to-OS communication unit 320 assigns a control code to multiple received commands, and transmits to the OS-to-OS communication unit 220 a packaged command that packages together the multiple commands and the control code.

At this point, the OS-to-OS communication unit 320, similarly to the OS-to-OS communication unit 220, includes a control code table in which multiple commands to be executed by Linux 200 are associated with a control code in advance. Additionally, the OS-to-OS communication unit 320 references the control code table, and determines whether or not there exists a control code corresponding to multiple commands temporarily stored in the storage unit. In the case of determining that there exists a control code corresponding to multiple commands temporarily stored, the OS-to-OS communication unit 320 assigns the specified control code to the multiple commands temporarily stored (that is, the multiple commands received from the device driver 310), and generates a packaged command.

The device driver 310 is software for controlling a device installed internally in the electronic device or externally connected equipment, and acts as a bridge enabling VxWorks 300 to control such a device or equipment. The device driver 310 is built into VxWorks 300, and controls the SWIP 230 of Linux 200.

More specifically, the device driver 310 analyzes a command received from the OS-to-OS communication unit 320, and generates a command to be executed by the SWIP 230 of Linux 200. Subsequently, the device driver 310 transmits the generated command to the OS-to-OS communication unit 320.

<Description of Control Code>

Next, the control code will be described in detail. FIGS. 7A and 7B are diagrams illustrating examples of a control code table according to the exemplary embodiment. The control code table illustrated in FIG. 7A is an example of a control code table included in the OS-to-OS communication unit 220. Meanwhile, the control code table illustrated in FIG. 7B is an example of a control code table included in the OS-to-OS communication unit 320.

In the control code table illustrated in FIG. 7A, an execution sequence for Command 1 to Command 3 is stipulated for Control Code 21, for example. More specifically, for example, it is stipulated that "the command to be executed first is Command 1". Also, for example, it is stipulated that "if the processing of Command 1 is successful, execute Command 2 next", "if the processing of Command 2 is successful, execute Command 3 next", and "if the processing of Command 3 is successful, end on successful processing of the packaged command". Furthermore, for example, it is stipulated that "if the processing of Command 1 fails, end on failure in the processing of the packaged command", "if the processing of Command 2 fails, end on failure in the processing of the packaged command", and "if the processing of Command 3 fails, end on failure in the processing of the packaged command".

Meanwhile, an execution sequence for Command a to Command c is stipulated for Control Code 22, for example. More specifically, for example, it is stipulated that "the command to be executed first is Command a" is stipulated. Also, for example, it is stipulated that "if the processing of Command a is successful, execute Command b next", "if the processing of Command b is successful, execute Command c next", and "if the processing of Command c is successful, end on successful processing of the packaged command". Furthermore, for example, it is stipulated that "if the processing of Command a fails, execute Command c next", "if the processing of Command b fails, end on failure in the processing of the packaged command", and "if the processing of Command c fails, end on failure in the processing of the packaged command". Note that herein, although Command c is to be executed if the processing of Command a fails, as an example of an alternative command to Command a, a Command d separate from Command a to Command c may also be stipulated for execution.

In this way, in the control code table included in the OS-to-OS communication unit 220, multiple commands to be received from the application 210 are associated with a control code in advance. Additionally, for a control code, information such as the order in which to execute multiple commands and conditions by which to end the execution of multiple commands is stipulated, for example. Also, for example, information such as a command to be executed next if the execution of a command among the multiple commands is successful, and a command to be executed next if the execution of a command among the multiple commands fails, is also stipulated.

Additionally, in the control code table included in the OS-to-OS communication unit 320 of FIG. 7B, multiple commands to be received from the device driver 310 are associated with a control code in advance, similarly to the control code table included in the OS-to-OS communication unit 220 of FIG. 7A.

For example, an execution sequence for Command 4 to Command 6 is stipulated for Control Code 31, for example. More specifically, for example, it is stipulated that "the command to be executed first is Command 4". Also, for example, it is stipulated that "if the processing of Command 4 is successful, execute Command 5 next", "if the processing of Command 5 is successful, execute Command 6 next", and "if the processing of Command 6 is successful, end on successful processing of the packaged command". Furthermore, for example, it is stipulated that "if the processing of Command 4 fails, end on failure in the processing of the packaged command", "if the processing of Command 5 fails, end on failure in the processing of the packaged command", and "if the processing of Command 6 fails, end on failure in the processing of the packaged command".

Meanwhile, an execution sequence for Command d to Command f is stipulated for Control Code 32, for example. More specifically, for example, it is stipulated that "the command to be executed first is Command d". Also, for example, it is stipulated that "if the processing of Command d is successful, execute Command e next", "if the processing of Command e is successful, execute Command f next", and "if the processing of Command f is successful, end on successful processing of the packaged command". Furthermore, for example, it is stipulated that "if the processing of Command d fails, execute Command f next", "if the processing of Command e fails, end on failure in the processing of the packaged command", and "if the processing of Command f fails, end on failure in the processing of the packaged command". Note that herein, although Command f is to be executed if the processing of Command d fails, as an example of an alternative command to Command d, a Command g separate from Command d to Command f may also be stipulated for execution.

In this way, in the control code table included in the OS-to-OS communication unit 320, multiple commands to be received from the device driver 310 are associated with a control code in advance. Additionally, for a control code, information such as the order in which to execute multiple commands and conditions by which to end the execution of multiple commands is stipulated, for example. Also, for example, information such as a command to be executed next if the execution of a command among the multiple commands is successful, and a command to be executed next if the execution of a command among the multiple commands fails, is also stipulated.

<Description of Processing Sequence in Image Processing Device>

Figure 8:
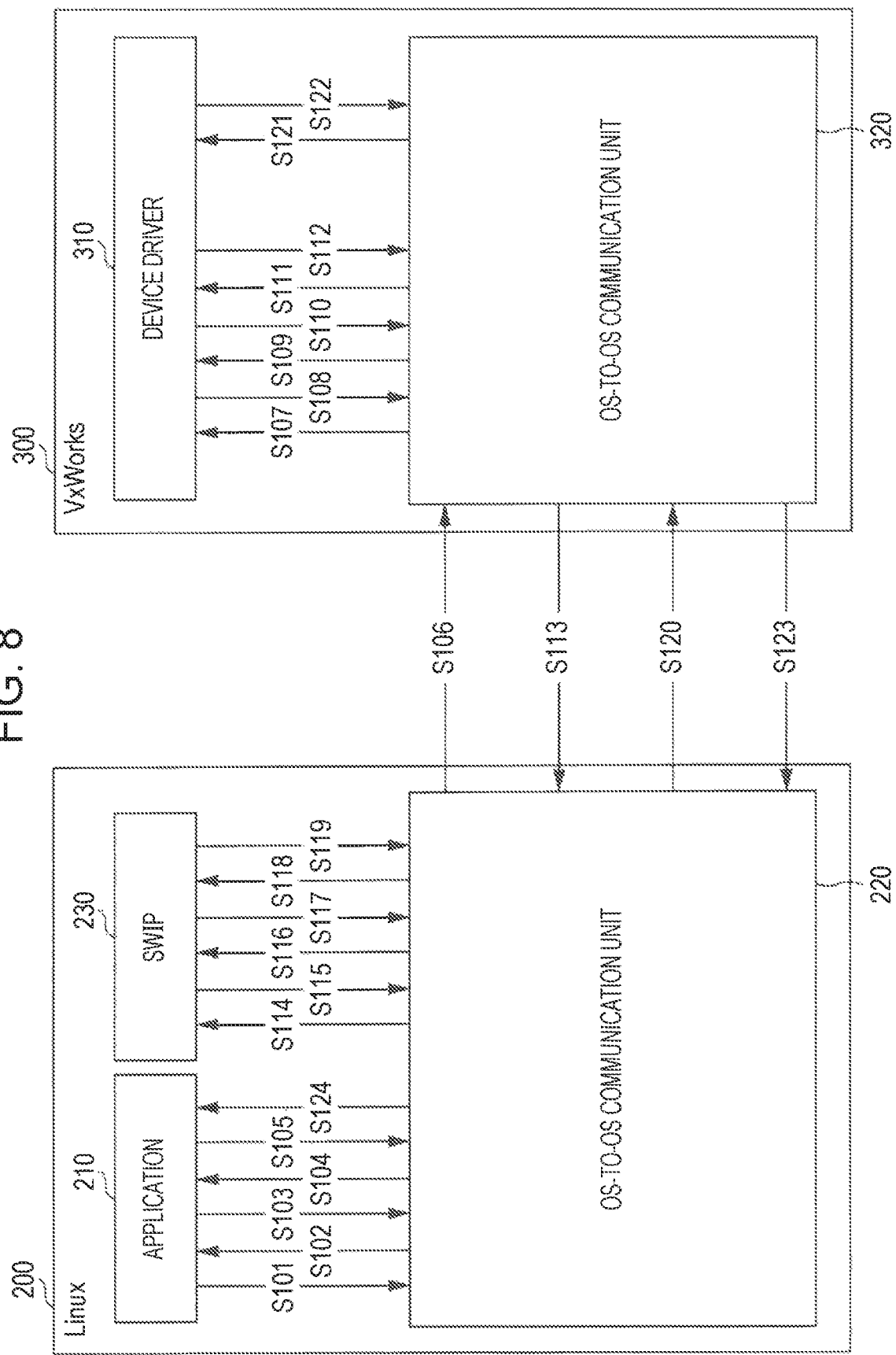
FIG. 8 is a diagram for explaining an example of the flow of a processing sequence in an image processing device according to an exemplary embodiment.

Next, the flow of a processing sequence in the image processing device 100 according to the exemplary embodiment will be described. FIG. 8 is a diagram for explaining an example of the flow of a processing sequence in the image processing device 100 according to the exemplary embodiment. The example illustrated in FIG. 8 illustrates a case in which the application 210 transmits three commands, and the OS-to-OS communication unit 220 packages together the three commands to generate a packaged command. Note that the three commands are herein designated "Command 1", "Command 2", and "Command 3". Also, suppose that the OS-to-OS communication unit 220 includes the control code table illustrated in FIG. 7A, while the OS-to-OS communication unit 320 includes the control code table illustrated in FIG. 7B.

First, for example, when the user issues an image processing instruction through the application 210, the application 210 transmits to the OS-to-OS communication unit 220 Commands 1 to 3 for executing the indicated image processing. At this point, the application 210 first transmits the first Command 1 to the OS-to-OS communication unit 220 (step 101). Next, the OS-to-OS communication unit 220 temporarily stores the received Command 1 in the storage unit, and replies to the application 210 (step 102). Next, the application 210 transmits the second Command 2 to the OS-to-OS communication unit 220 (step 103). Next, the OS-to-OS communication unit 220 temporarily stores the received Command 2 in the storage unit, and replies to the application 210 (step 104). Next, the application 210 transmits the third Command 3 to the OS-to-OS communication unit 220 (step 105).

At this point, a control code corresponding to the three commands (Commands 1 to 3) exists in the control code table. Accordingly, the OS-to-OS communication unit 220, as a result of referencing the control code table, determines that there exists a control code corresponding to the three commands (Commands 1 to 3) temporarily stored in the storage unit, and specifies the relevant control code. Next, the OS-to-OS communication unit 220 assigns the specified control code and packages together the three commands. Subsequently, the OS-to-OS communication unit 220 transmits the generated packaged command to the OS-to-OS communication unit 320 of VxWorks 300 (step 106). Note that in the example illustrated in FIG. 8, Control Code 21 illustrated in FIG. 7A is assigned.

Next, the OS-to-OS communication unit 320 ascertains the order in which to execute the respective commands included in the packaged command, based on Control Code 21 included in the received packaged command. Subsequently, the OS-to-OS communication unit 320 extracts one command at a time out of the packaged command according to the ascertained order, and transmits the extracted command to the device driver 310. At this point, first, the OS-to-OS communication unit 320 transmits the first Command 1 to the device driver 310 (step 107).

Next, the device driver 310 analyzes Command 1, and generates a first command to be executed by the SWIP 230 of Linux 200 (taken to be Command 4 in the illustrated example). Subsequently, the device driver 310 transmits the generated Command 4 to the OS-to-OS communication unit 320 (step 108). Next, the OS-to-OS communication unit 320 cross-references the process result of Command 1 and Control Code 21 to conduct subsequent processing. At this point, since Command 4 is generated and the process result of Command 1 is successful, the OS-to-OS communication unit 320 decides that Command 2 is to be executed next. Subsequently, the OS-to-OS communication unit 320 transmits the second Command 2 to the device driver 310 (step 109).

Next, the device driver 310 analyzes Command 2, and generates a second command to be executed by the SWIP 230 of Linux 200 (taken to be Command 5 in the illustrated example). Subsequently, the device driver 310 transmits the generated Command 5 to the OS-to-OS communication unit 320 (step 110). Next, the OS-to-OS communication unit 320 cross-references the process result of Command 2 and Control Code 21 to conduct subsequent processing. At this point, since Command 5 is generated and the process result of Command 2 is successful, the OS-to-OS communication unit 320 decides that Command 3 is to be executed next.

Subsequently, the OS-to-OS communication unit 320 transmits the third Command 3 to the device driver 310 (step 111).

Next, the device driver 310 analyzes Command 3, and generates a third command to be executed by the SWIP 230 of Linux 200 (taken to be Command 6 in the illustrated example). Subsequently, the device driver 310 transmits the generated Command 6 to the OS-to-OS communication unit 320 (step 112). Next, the OS-to-OS communication unit 320 cross-references the process result of Command 3 and Control Code 21 to conduct subsequent processing. At this point, since Command 6 is generated and the process result of Command 3 is successful, the OS-to-OS communication unit 320 decides to end the processing of the packaged command. Consequently, the processing for the packaged command generated by the OS-to-OS communication unit 220 ends. Next, processing is conducted for a packaged command including the three commands generated by the device driver 310 (in other words, Commands 4 to 6).

At this point, a control code corresponding to the three commands (Commands 4 to 6) exists in the control code table. Accordingly, the OS-to-OS communication unit 320, as a result of referencing the control code table, determines that there exists a control code corresponding to the three commands (Commands 4 to 6) temporarily stored in the storage unit, and specifies the relevant control code. Next, the OS-to-OS communication unit 320 assigns the specified control code and packages together the three commands.

Subsequently, the OS-to-OS communication unit 320 transmits the generated packaged command to the OS-to-OS communication unit 220 of Linux 200 (step 113). Note that in the example illustrated in FIG. 8, Control Code 31 illustrated in FIG. 7B is assigned.

Next, the OS-to-OS communication unit 220 ascertains the order in which to execute the respective commands included in the packaged command, based on Control Code 31 included in the received packaged command. Subsequently, the OS-to-OS communication unit 220 extracts one command at a time out of the packaged command according to the ascertained order, analyzes the extracted command, and transmits a function for operating register values to the SWIP 230. At this point, first, the OS-to-OS communication unit 220 analyzes the first Command 4, and transmits a function for operating register values to the SWIP 230 (step 114).

Next, the SWIP 230 conducts image processing according to the function based on Command 4, and transmits the process result to the OS-to-OS communication unit 220 (step 115). This process result includes information indicating whether or not the image processing in the SWIP 230 is successful. Next, the OS-to-OS communication unit 220 cross-references the process result and Control Code 31 to conduct subsequent processing. At this point, if the process result is successful, the OS-to-OS communication unit 220 decides that the second Command 5 is to be executed next. Subsequently, the OS-to-OS communication unit 220 analyzes Command 5, and transmits a function for operating register values to the SWIP 230 (step 116).

Next, the SWIP 230 conducts image processing according to the function based on Command 5, and transmits the process result to the OS-to-OS communication unit 220 (step 117). Next, the OS-to-OS communication unit 220 cross-references the process result and Control Code 31 to conduct subsequent processing. At this point, if the process result is successful, the OS-to-OS communication unit 220 decides that the third Command 6 is to be executed next. Subsequently, the OS-to-OS communication unit 220 analyzes Command 6, and transmits a function for operating register values to the SWIP 230 (step 118).

Next, the SWIP 230 conducts image processing according to the function based on Command 6, and transmits the process result to the OS-to-OS communication unit 220 (step 119). Next, the OS-to-OS communication unit 220 cross-references the process result and Control Code 31 to conduct subsequent processing. At this point, if the process result is successful, the OS-to-OS communication unit 220 decides to end the processing of the packaged command. Additionally, the OS-to-OS communication unit 220 transmits a reply command indicating that the processing of Commands 4 to 6 is successful to the OS-to-OS communication unit 320 of VxWorks 300 (step 120).

Next, the inter-OS communication unit 320 transmits the reply command to the device driver 310 (step 121). Next, the device driver 310 transmits a reply command for the application 210 to the OS-to-OS communication unit 320 (step 122). At this point, the reply command for the application 210 includes information indicating that the image processing is successful. Next, the OS-to-OS communication unit 320 transmits the reply command for the application 210 to the OS-to-OS communication unit 220 of Linux 200 (step 123). Next, the OS-to-OS communication unit 220 transmits the reply command for the application 210 to the application 210 (step 124). Subsequently, the processing sequence in the image processing device 100 ends.

In this way, in the present exemplary embodiment, in the case of processing three commands by the SWIP method, for example, VxWorks 300 does not transmit a command execution result to Linux 200 every time each of the three commands is executed, but instead transmits a process result to Linux 200 after the processing of the three commands ends. Likewise, Linux 200 transmits a process result to VxWorks 300 after the processing of the received packaged command ends. Additionally, OS-to-OS communication is conducted in step 106, step 113, step 120, and step 123. In other words, OS-to-OS communication is conducted four times in order to process three commands generated by the application 210. With the ASIC method of the related art illustrated in FIG. 1, in the case of processing three commands, OS-to-OS communication is conducted six times, as discussed earlier. Also, with the SWIP method of the related art illustrated in FIG. 2, in the case of processing three commands, OS-to-OS communication is conducted 12 times, as discussed earlier.

On the other hand, in the exemplary embodiment, the controller 110 generates a packaged command by assigning a control code to multiple commands, and extracts and executes commands one at a time from the packaged command. Also, the controller 110 conducts subsequent processing based on the process result of a command and the control code. In this way, by assigning a control code to process multiple commands, the number of times that OS-to-OS communication is conducted may be decreased and the overall processing time may be shortened compared to a configuration in which OS-to-OS communication is produced for every command, such as with the ASIC method and the SWIP method of the related art, for example. In other words, in the exemplary embodiment, a decrease in productivity with regard to image processing is minimized compared to the ASIC method and the SWIP method of the related art, for example.

Herein, the example illustrated in FIG. 8 illustrates a case in which each of the commands included in the packaged command (Commands 1 to 6) is successful, but a case in which the processing of a command fails is also conceivable. Accordingly, the case in which the processing of a command fails will be described.

In Control Code 21 illustrated in FIG. 7A, for Command 1 it is stipulated that "if the processing of Command 1 fails, end on failure in processing of packaged command". Herein, if the processing of Command 1 fails, or in other words, if the generation of Command 4 fails in step 108, the device driver 310 transmits information indicating that the processing according to Command 1 has failed to the OS-to-OS communication unit 320. Next, since the process result of Command 1 is failure, the OS-to-OS communication unit 320 does not transmit the second Command 2 to the device driver 310, but instead ends on failure in the processing of the packaged command. In this way, when the processing of the packaged command fails, the processing of the subsequent steps 109 to 122 is not conducted, and in step 123, the OS-to-OS communication unit 320 transmits a reply command for the application 210 to the OS-to-OS communication unit 220 of Linux 200. The reply command includes information indicating that the image processing has failed.

Also, in Control Code 31 illustrated in FIG. 7B, for Command 4 it is stipulated that "if the processing of Command 4 fails, end on failure in processing of packaged command". Herein, if the image processing based on Command 4 fails, in step 115, the SWIP 230 transmits a process result indicating that the image processing based on Command 4 has failed to the OS-to-OS communication unit 220. Next, since the process result is failure, the OS-to-OS communication unit 220 does not transmit the second Command 5 to the SWIP 230, but instead ends the processing of the packaged command. In this way, when the processing of the packaged command fails, the processing of the subsequent steps 116 to 119 is not conducted, and in step 120, the OS-to-OS communication unit 220 transmits a reply command indicating that the processing of Commands 4 to 6 has failed to the OS-to-OS communication unit 320 of VxWorks 300. After that, in steps 121 to 124, reply commands indicating that the processing has failed are transmitted and received in the OS-to-OS communication unit 320, the device driver 310, the OS-to-OS communication unit 220, and the application 210.

In addition, like Command a of Control Code 22 illustrated in FIG. 7A, or Command d of Control Code 32 illustrated in FIG. 7B, for example, the command to be executed next if the processing of a command is successful may be different from the command to be executed next if the processing of a command fails. In this case, the command to be executed next changes depending on the process result of the preceding command.

More specifically, in the example illustrated in FIG. 8, for example, suppose that for Command 1 it is stipulated that "if the process result of Command 1 is successful, execute Command 2 next" and "if the process result of Command 1 is failure, execute Command 3 next". In this case, if the processing of Command 1 fails, the processing of step 109 and step 110 is not conducted, and instead the processing of step 111 is conducted. In other words, the OS-to-OS communication unit 320 does not transmit the second Command 2 but instead transmits the third Command 3 to the device driver 310. After that, the OS-to-OS communication unit 320 assigns a control code and packages together Command 4 generated by Command 1 and Command 6 generated by Command 3. Subsequently, in step 113, the OS-to-OS communication unit 320 transmits the generated packaged command to the OS-to-OS communication unit 220 of Linux 200.

Also, in the example illustrated in FIG. 8, for example, suppose that for Command 4 it is stipulated that "if the process result of Command 4 is successful, execute Command 5 next" and "if the process result of Command 4 is failure, execute Command 6 next". In this case, if the processing of Command 4 fails, the processing of step 116 and step 117 is not conducted, and instead the processing of step 118 is conducted. In other words, the OS-to-OS communication unit 220 does not analyze the second Command 5, but instead analyzes the third Command 6, and transmits a function based on Command 6 to the SWIP 230. After that, if the processing of the function based on Command 6 is successful, the processing of the packaged command becomes successful, and in step 120, the OS-to-OS communication unit 320 transmits a reply command indicating that the processing of Commands 4 to 6 is successful to the OS-to-OS communication unit 320 of VxWorks 300.

<Description of Processing of Packaged Command>

Figure 9:
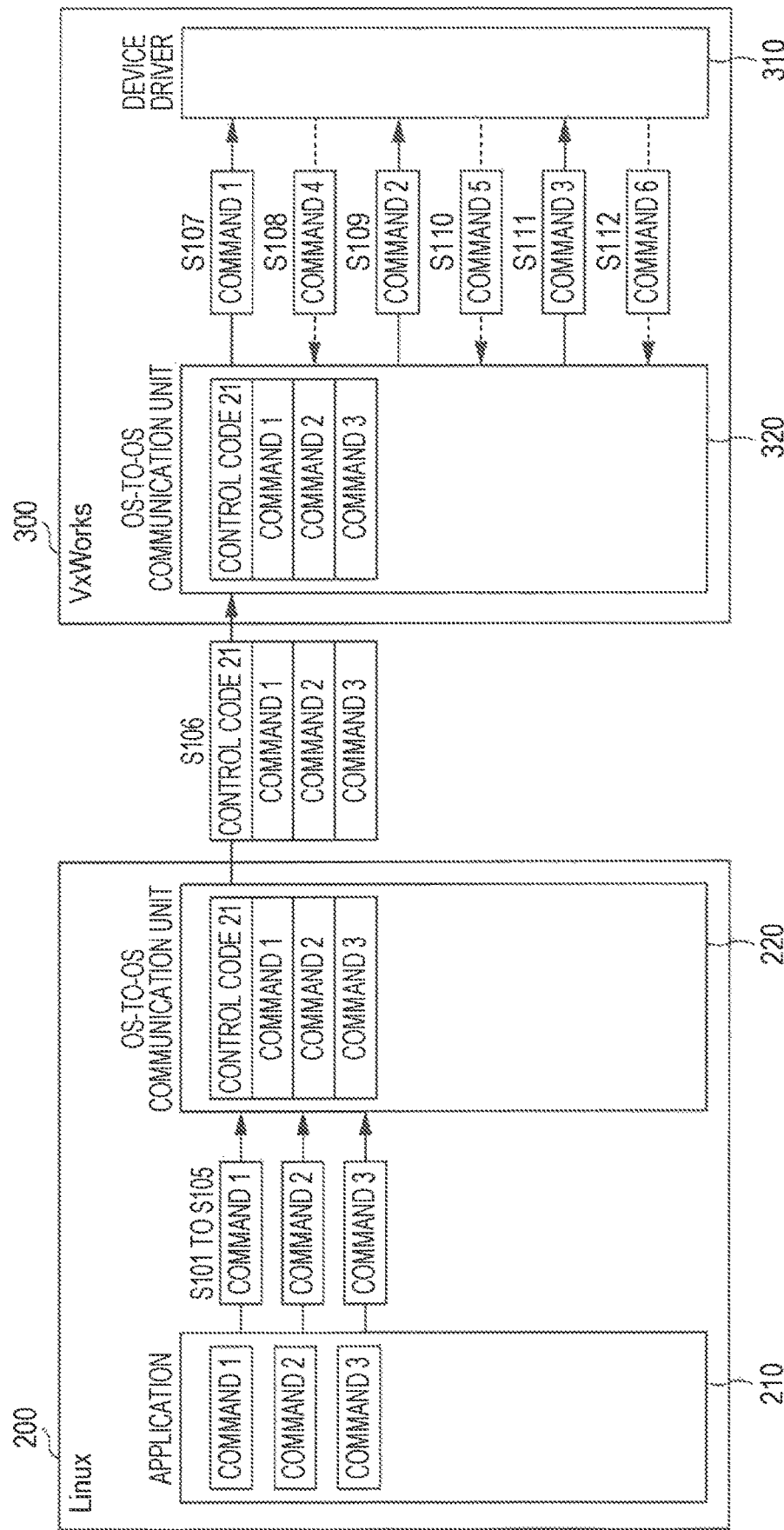
FIG. 9 is a diagram for explaining an example of a packaged command according to an exemplary embodiment.

The processing of a packaged command according to the exemplary embodiment will also be described with reference to FIG. 9. FIG. 9 is a diagram for explaining an example of a packaged command according to the exemplary embodiment. The example illustrated in FIG. 9, similarly to the example illustrated in FIG. 8, illustrates a case in which the application 210 transmits three commands (Commands 1 to 3), and the OS-to-OS communication unit 220 packages together the three commands to generate a packaged command. Also, the steps indicated below and the steps illustrated in FIG. 9 correspond to the respective steps in FIG. 8.

First, the application 210 transmits Commands 1 to 3 one at a time to the OS-to-OS communication unit 220 (step 101 to step 105). Next, the OS-to-OS communication unit 220 references the control code table, and packages together the three commands (Commands 1 to 3) by assigning the corresponding control code. Subsequently, the OS-to-OS communication unit 220 transmits the packaged command to the OS-to-OS communication unit 320 of VxWorks 300 (step 106). Note that the example illustrated in FIG. 9 supposes that Control Code 21 illustrated in FIG. 7A is assigned.

Next, the OS-to-OS communication unit 320 extracts and transmits the first Command 1 to the device driver 310, based on Control Code 21 included in the received packaged command (step 107). Next, the device driver 310 analyzes Command 1, and generates a first command to be executed by the SWIP 230 of Linux 200 (taken to be Command 4, similarly to FIG. 8). Subsequently, the device driver 310 transmits the generated Command 4 to the OS-to-OS communication unit 320 (step 108).

Next, the OS-to-OS communication unit 320 cross-references the process result of Command 1 and Control Code 21, and decides that Command 2 is to be executed. Subsequently, the OS-to-OS communication unit 320 transmits Command 2 to the device driver 310 (step 109). Next, the device driver 310 analyzes Command 2, and generates a second command to be executed by the SWIP 230 of Linux 200 (taken to be Command 5, similarly to FIG. 8). Subsequently, the device driver 310 transmits the generated Command 5 to the OS-to-OS communication unit 320 (step 110).

Next, the OS-to-OS communication unit 320 cross-references the process result of Command 2 and Control Code 21, and decides that Command 3 is to be executed. Subsequently, the OS-to-OS communication unit 320 transmits Command 3 to the device driver 310 (step 111). Next, the device driver 310 analyzes Command 3, and generates a third command to be executed by the SWIP 230 of Linux 200 (taken to be Command 6, similarly to FIG. 8). Subsequently, the device driver 310 transmits the generated Command 6 to the OS-to-OS communication unit 320 (step 112).

In this way, commands transmitted by the application 210 are assigned a control code and packaged together. Also, the commands inside the packaged command are extracted and executed in order, according to an execution sequence stipulated by the control code. Note that although FIG. 9 only illustrates the processing from step 101 to step 112, after the processing of step 112, the processing of step 113 and thereafter in FIG. 8 is conducted.

Note that the image processing device 100 is configured to include the SWIP 230 in the exemplary embodiment, but is not limited to such a configuration. For example, since OS-to-OS communication is also conducted in an image processing device with a multi-processor configuration including an ASIC as illustrated in FIG. 1, the exemplary embodiment may also be applied to such OS-to-OS communication.

In addition, although the exemplary embodiment describes OS-to-OS communication between Linux and VxWorks, the exemplary embodiment is not limited to such a configuration. The exemplary embodiment may also be applied to cases in which OS-to-OS communication is conducted by OSes other than Linux and VxWorks.

Furthermore, although an example of applying the exemplary embodiment to an image processing device 100 is described in the foregoing, the target of application of the exemplary embodiment is not limited to the image processing device 100. The exemplary embodiment may be applied to various types of equipment (electronic devices) insofar as the equipment is an electronic device with a multi-processor configuration, in which the memories (storage units) used by individual CPUs are independent, and OS-to-OS communication is conducted.

Note that while the foregoing describes various exemplary embodiments and exemplary modifications, obviously these exemplary embodiments and exemplary modifications may also be combined together.

Furthermore, the present disclosure is not limited to the foregoing exemplary embodiments, and may also be carried out in various aspects without departing from the principles of the present disclosure.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic device, comprising:
   a first controller configured to execute processing based on a first operating system (OS); and
   a second controller configured to execute processing based on a second OS, wherein:
   the first controller is configured to:
      generate a first plurality of commands to be executed by the second controller;

determine whether the first plurality of commands correspond to a first control code stored in the first controller based on a predetermined correspondence relationship;
in response to the first plurality of commands corresponding to the first control code, assign the first control code to the first plurality of commands and generate a package including (i) the generated first plurality of commands and (ii) the assigned first control code, which includes an execution sequence of the generated first plurality of commands; and
transmit the generated package to the second controller; and
the second controller is configured to:
receive the generated package from the first controller;
execute the first plurality of commands in the received package based on a second OS in accordance with the execution sequence included in the assigned first control code;
in response to the execution of a first command of the first plurality of commands being successful, execute a second command stipulated by the first control code as a command to be executed in a successful case;
in response to the execution of the first command of the first plurality of commands failing, (i) execute a third command stipulated by the first control code as a command to be executed in an unsuccessful case, (ii) assign a second control code based on the third command, and (iii) transmit the second control code to the first controller to be executed by the first controller; and
transmit a process result of the assigned first control code to the first controller, the process result including the second control code for the first controller to perform based on a second plurality of commands.

2. The electronic device according to claim 1, wherein the second controller is configured to:
transmit the process result of the first plurality of commands to the first controller only after a processing of the first plurality of commands ends.

3. The electronic device according to claim 2, wherein the second controller is configured to:
assign, to the second plurality of commands to be executed by the first controller, the second control code stipulating an execution sequence of the second plurality of commands.

4. The electronic device according to claim 1, wherein the second controller is configured to, during the execution of the first plurality of commands, conduct processing after executing a first command of the first plurality of commands according to the execution sequence included in the first control code, and an execution result of the first command of the first plurality of commands.

5. The electronic device according to claim 4, wherein the second controller is configured to:
in response to the execution of the first command of the first plurality of commands being successful, execute asecond command stipulated by the first control code as a command to be executed in a successful case, and
in response to the execution of the first command failing, ending the execution of the first plurality of commands without executing the second command.

6. An electronic device, comprising:
a first controller that executes processing based on a first operating system (OS); and
a second controller that executes processing based on a second OS, wherein:
the first controller is configured to:
determine whether a collective first plurality of commands correspond to a first control code stored in the first controller based on a predetermined correspondence relationship; and
in response to the first plurality of commands corresponding to the first control code, assign the first control code to the first plurality of commands and generate a package including (i) the first plurality of commands and (ii) the assigned first control code, which includes an execution sequence of the first plurality of commands; and
transmit the generated package to the second controller; and
the second controller is configured to:
execute the first plurality of commands based on the execution sequence of the first control code received from the first controller;
in response to the execution of a first command of the first plurality of commands being successful, execute a second command stipulated by the first control code as a command to be executed in a successful case;
in response to the execution of the first command of the first plurality of commands failing, (i) execute a third command stipulated by the first control code as a command to be executed in an unsuccessful case, (ii) assign a second control code based on the third command, and (iii) transmit the second control code to the first controller to be executed by the first controller; and
transmit a process result of the assigned first control code to the first controller, the process result including the second control code for the first controller to perform based on a second plurality of commands.

7. An image processing device, comprising:
a first controller configured to execute processing based on a first operating system (OS); and
a second controller configured to execute processing based on a second OS, wherein
the first controller is configured to:
generate a command to be executed by the second controller, and
determine whether the first plurality of commands correspond to a first control code stored in the first controller based on a predetermine correspondence relationship;
in response to the first plurality of commands corresponding to the first control code, assign the first control code to the first plurality of commands and generate a package including (i) the first plurality of commands and (ii) the asigned first control code, which includes an execution sequence of the first plurality of commands; and
transmit the generated package to the second controller; and the second controller is configured to:
receive the first plurality of commands from the first controller, and
execute the first plurality of commands based on the execution sequence stipulated by the assigned first control code,
in response to the exectuion of a first command of the first plurality of commands being successful, execute a second command stipulated by the first control code as a command to be executed in a successful case;

in response to the execution of the first command of the first plurality of commands failing, (i) execute a third command stipulated by the first control code as a command to be executed in an unsuccessful case, (ii) assign a second control code based on the third command, and (iii) transmit the second control code to the first controller to be executed by the first controller; and transmit a process result of the assigned first control code to the frist controller, the process result including the second control code for the first controller to perfrom based on a second plurality of commands.

* * * * *